(12) United States Patent
Almulhem et al.

(10) Patent No.: US 6,587,431 B1
(45) Date of Patent: Jul. 1, 2003

(54) SUPERTRUNKING FOR PACKET SWITCHING

(75) Inventors: Abdulaziz S. Almulhem, Dhahran (SA); Alan S. J. Chapman, Kanata (CA); John E. Vincent, Ottawa (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/215,262

(22) Filed: Dec. 18, 1998

(51) Int. Cl.$^7$ .................. H04L 12/00; H04L 12/56; G06F 13/00
(52) U.S. Cl. .................. 370/229; 370/392; 370/394; 370/395.3; 370/400; 370/902; 709/105
(58) Field of Search .................. 370/229, 230–232, 370/235, 237, 351, 355, 389, 392, 394, 395.1, 395.3, 395.52, 400, 401, 902; 709/105

(56) References Cited

U.S. PATENT DOCUMENTS

| | | | |
|---|---|---|---|
| 4,703,475 A | | 10/1987 | Dretzka et al. |
| 5,168,492 A | | 12/1992 | Beshai et al. |
| 5,745,486 A | | 4/1998 | Beshai et al. ............... 370/352 |
| 5,745,685 A | * | 4/1998 | Kirchner et al. ............ 709/237 |
| 5,809,239 A | * | 9/1998 | Dan et al. ................... 701/104 |
| 6,091,733 A | * | 7/2000 | Takagi et al. ............... 370/401 |
| 6,208,644 B1 | * | 3/2001 | Pannell et al. .............. 370/389 |
| 6,246,684 B1 | * | 6/2001 | Chapman et al. ........... 370/363 |
| 6,259,705 B1 | * | 7/2001 | Takahashi et al. .......... 370/230 |
| 6,266,335 B1 | * | 7/2001 | Bhaskaran ................. 370/389 |
| 6,272,522 B1 | * | 8/2001 | Lin et al. .................... 709/200 |

OTHER PUBLICATIONS

Bakouris, M.G.; Giamniadakis, G.S.; Reisis, D.I.; Stamoulis, G.D.; Theologou, O.; Optimizing PCS Network Performance by Utilising a Multilink B–ISDN Routing Protocol; IEEE; Apr. 1994; pp. 330–334.

Ohtsuki, Kazuhiro; Takemura, Kouichi; Kurose, James F.; Okada, Hiromi; Tezuka, Yoshikazu; A High–Speed Packet Swtich Architecture with a Multichannel Bandwidth Allocation; IEEE; Mar. 1991; pp. 155–162.

* cited by examiner

*Primary Examiner*—Hassan Kizou
*Assistant Examiner*—Ahmed Elallam (57) ABSTRACT

A packet routing system is disclosed that allows for efficient transfers of IP streams from router to router with use of supertrunking. The router that receives an IP stream set for transmission on a supertrunk, individually inputs the IP packets, determines the logical output port corresponding to the IP stream, assigns each IP packet to a physical output port within the logical output port with use of a load balancing function, encapsulates each IP packet within a supertrunk header comprising an IP stream identifier and a packet sequence identifier and an IP header that has identical source and destination addresses as the original IP packet, and forwards the encapsulated packets to the receiving router via a plurality of physical links. The router that receives the encapsulated IP packets then re-orders the packets into the proper order with use of a sorting algorithm, removes the IP and supertrunk headers, and outputs an IP stream similar to that input to the original router.

33 Claims, 7 Drawing Sheets

SUPERTRUNKING FOR PACKET SWITCHING

RELATED APPLICATIONS

U.S. co-pending patent application Ser. No. 09/215,376 entitled "Flow Level Demultiplexing within Routers" filed on Dec. 18, 1998 by Almulhem et al, and Ser. No. 09/215,377 entitled "Scheduling Technique for Delayed Queue Service" filed on Dec. 18, 1998 by Alulhem et al, and both assigned to the assignee of the present application, disclose and claim subject matter related to that of the present invention.

FIELD OF THE INVENTION

This invention relates generally to data routing systems and more specifically to data packet routing systems over multiple physical links.

BACKGROUND OF THE INVENTION

The following paragraphs give definitions of terms used throughout this document.

Physical link: a single point-to-point (PPP) serial transmission link between two nodes in the network (such as between two routers or between a router and a host machine). The implementation of a serial link may take various forms such as an optical fibre or a wavelength segment on an optical fibre, among other options.

Physical input/output port: the input/output port of the router that supports one physical link.

Logical link: a point-to-point traffic path between two routers that is composed of multiple physical links and appears from a routing point of view to be one link.

Logical input/output port: the collection of physical input/output ports that support the physical links of a logical link.

Supertrunk: the aggregation of physical links into larger, logical links.

Transmission Control Protocol (TCP): a library of routines that applications can use when they need reliable network communications with another computer. TCP is responsible for verifying the correct delivery of data from client to server. It adds support to detect errors or lost data and to trigger reconstruction until the data is correctly and completely received.

Internet Protocol (IP): a library of routines that TCP calls on, but which is also available to applications that do not use TCP. IP is responsible for transporting packets of data from node to node. It forwards each packet based on a four-byte destination address (the IP address).

There has been an incredible increase in demand for bandwidth within communication routing systems over the past few years. This increase is particularly pronounced when considering the increase in data networking information transferred within these systems directly associated with the expanding popularity of the Internet. Soon the traffic rates needed between router pairs will be higher than the serial link transmission technology available. Currently, the highest transmission rate is 9.6 Gb/s, (on a single wavelength) but 2.4 Gb/s is much more commonly available. Purchasers of routers are already demanding 2.4 Gb/s links and it is expected that within a short time, some routes will require multiple physical links.

There are other reasons why multi-link routes are attractive. In situations where routers are clustered in close physical proximity, the use of multiple links might allow the interconnect to be multiple low cost links rather than single high cost connections. Another reason is that the application of the multi-link approach might also be a fast way to provide higher rate ports on existing routers. Yet another reason is that the use of multiple links allows more granularity of growth than the large steps in the transmission network and so may allow savings in bandwidth costs. Finally, another reason is that multiple links can allow for redundancy to cover link failure without requiring the spare link to cover the whole bandwidth of the route.

When using multiple links between two routers, it is a requirement that the total bandwidth be used efficiently. That is to say, the traffic offered must be spread over all available links, hereinafter referred to as load balancing. It would not be acceptable to have one link under utilized while traffic is queued on another. This suggests that packets from any source can be delivered over any link to any destination. In fact, because of the bursting nature of the traffic, allocating links statically to particular sources or destinations would result in inefficient use of the total available bandwidth.

When traffic streams are spread over multiple links, successive packets from a particular flow (for example, a TCP connection between two IP hosts) can travel over different lengths and may arrive at the destination out of order. The variability of delay can be caused by different path lengths or different congestion levels on the paths, as well as the normal indeterminacy introduced by queuing and scheduling. The TCP can accommodate some mis-ordering of packets, but there is a problem if too much mis-ordering occurs on a connection where the transmitter is using the fast retransmission protocol.

Therefore, when utilizing a supertrunk to transfer data between two routers, it is important to establish a routing system that comprises both an efficient load balancing function to distribute the individual packets among the physical links and an effective sorting function to handle mis-ordered data packets. Another key consideration, is the compatibility of the protocol headers, corresponding to the data packets after having load balancing information attached, with the networks comprised within the physical links of a supertrunk. Each of the physical links of a supertrunk may be implemented with a series of connections within a series of networks with different protocols. The individual data packets traversing these physical links must have a header recognized by these different networks without modifications being required at the network level.

Hence, a general implementation of a routing system is required that supports supertrunks and, as a result, provides more efficient use of bandwidth within a series of physical links. This supertrunk routing system should not make significant changes to the overall operation of the current routing systems or networks within the physical links, but should allow individual IP packets from a single IP stream to be transferred from one router to another via different physical links.

SUMMARY OF THE INVENTION

It is an object of the present invention to overcome the disadvantages of the prior art and, in particular, to provide an apparatus and method for increasing the efficiency of data packet communications.

According to a first aspect, the present invention provides a forwarding node capable of operation within a router that transfers digital data with a plurality of other routers within a packet routing system, the forwarding node comprising: a load balancing device that, when input with individual packets of a data stream, reads a logical output port corresponding to the data stream, assigns each of the individual packets of the data stream to a physical output port within the logical output port based upon physical link criteria, encapsulates the individual packets with a first routing header that comprises a data stream identifier, a packet sequence identifier, and a physical output port identifier, and outputs the packets to their assigned physical output ports; and a packet sorting device that, when input with encapsulated packets, re-orders the packets into the proper order with use of a sorting algorithm utilizing the packet sequence identifiers and outputs a data stream corresponding to the re-ordered packets.

According to a second aspect, the present invention provides a router capable of operation within a packet routing system that transfers digital data between a plurality of the routers, the router comprising: a route controller; a rotator space switch; at least one first forwarding node, coupled to both the route controller and the rotator space switch, comprising a load balancing device that, when input with individual packets of a data stream, reads a logical output port corresponding to the data stream, assigns each of the individual packets of the data stream to a physical output port within the logical output port based upon physical link criteria, encapsulates the individual packets with a first routing header that comprises a data stream identifier, a packet sequence identifier, and a physical output port identifier, and outputs the packets to their assigned physical output ports; at least one second forwarding node, coupled to both the route controller and the rotator space switch, that is arranged to operate as a physical output port for outputting encapsulated packets to at least one transmission apparatus; at least one third forwarding node, coupled to both the route controller and the rotator space switch, that is arranged to operate as a physical input port for receiving encapsulated packets from at least one transmission apparatus; and at least one fourth forwarding node, coupled to both the route controller and the rotator space switch, comprising a packet sorting device that, when input with encapsulated packets, re-orders the packets into the proper order with use of a sorting algorithm utilizing the packet sequence identifiers and outputs a data stream corresponding to the re-ordered packets.

According to a third aspect, the present invention provides a packet routing system that transfers digital data between at least one first router and at least one second router, the packet routing system comprising: the first router comprising: a first route controller; a first rotator space switch; at least one first forwarding node, coupled to both the first route controller and the first rotator space switch, comprising a load balancing device that, when input with individual packets of a data stream, reads a logical output port corresponding to the data stream, assigns each of the individual packets of the data stream to a physical output port within the logical output port based upon physical link criteria, encapsulates the individual packets with a first routing header that comprises a data stream identifier, a packet sequence identifier, and a physical output port identifier, and outputs the packets to their assigned physical output ports; at least one second forwarding node, coupled to both the first route controller and the first rotator space switch, that is arranged to operate as a physical output port for outputting encapsulated packets to at least one transmission apparatus; a plurality of transmission apparatuses coupled between the first and second routers; and the second router comprising: a second route controller; a second rotator space switch; at least one third forwarding node, coupled to both the second route controller and the second rotator space switch, that is arranged to operate as a physical input port for receiving encapsulated packets from at least one transmission apparatus; and at least one fourth forwarding node, coupled to both the second route controller and the second rotator space switch, comprising a packet sorting device that, when input with encapsulated packets, re-orders the packets into the proper order with use of a sorting algorithm utilizing the packet sequence identifiers and outputs a data stream corresponding to the re-ordered packets.

According to a fourth aspect, the present invention provides in a packet routing system comprising a plurality of routers, a method of transferring digital data between the routers comprising the steps of: inputting individual packets of a data stream into a first router; reading a logical output port corresponding to the data stream of the individual packets; assigning each of the individual packets of the data stream to a physical output port within the logical output port based upon physical link criteria; encapsulating each of the individual packets with a first routing header that comprises a data stream identifier, a packet sequence identifier, and a physical output port identifier corresponding to the assigned physical output port; transmitting each of the encapsulated packets, via their assigned physical output port, to a second router; re-ordering the resulting packets into the proper order with use of a sorting algorithm utilizing the packet sequence identifiers; and outputting a data stream corresponding to the re-ordered packets.

BRIEF DESCRIPTION OF THE DRAWINGS

The preferred embodiment of the present invention is described with reference to the following figures, in which.

DETAILED DESCRIPTION OF THE PREFERRED EMBODIMENT

Figure 1A:
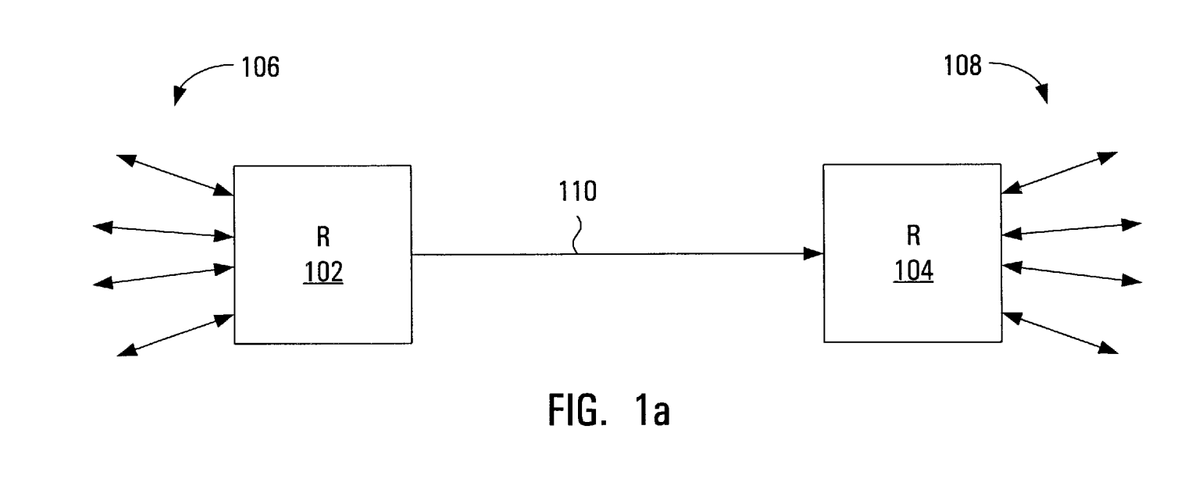
FIGS. 1a and 1b are simplified diagrams illustrating logical and physical routing links respectively.
Figure 1B:
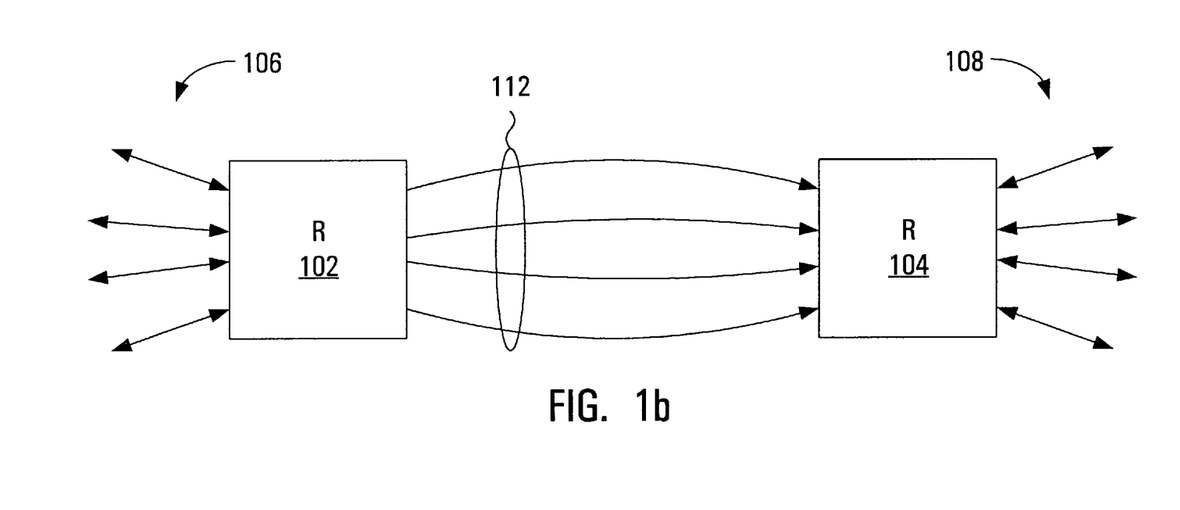

FIGS. 1a and 1b illustrate example logical and physical routing systems respectively that depict communication links from a first router 102 to a second router 104. Both the first and second routers 102,104 are connected to a plurality of other communication links 106,108 respectively. Within FIG. 1a, a logical link 110 is shown coupled between the routers 102,104. In this particular example, the logical link is a 3.5 Gb/s connection. FIG. 1b illustrates a series of physical links 112, that make up a supertrunk, coupled between the routers 102,104 that together are equivalent to the logical link 110. The supertrunk 112, in this example, comprises four physical links that when combined total the 3.5 Gb/s of the logical link 110.

As described previously, each of the physical links 112 depicted in FIG. 1b may be implemented with a series of connections within a series of different networks. Despite appearing within FIG. 1b as being directly connected and physically local, it should be understood that physical links 112 are typically quite complex with the routers 102,104 possibly a large distance from each other.

Figure 2:
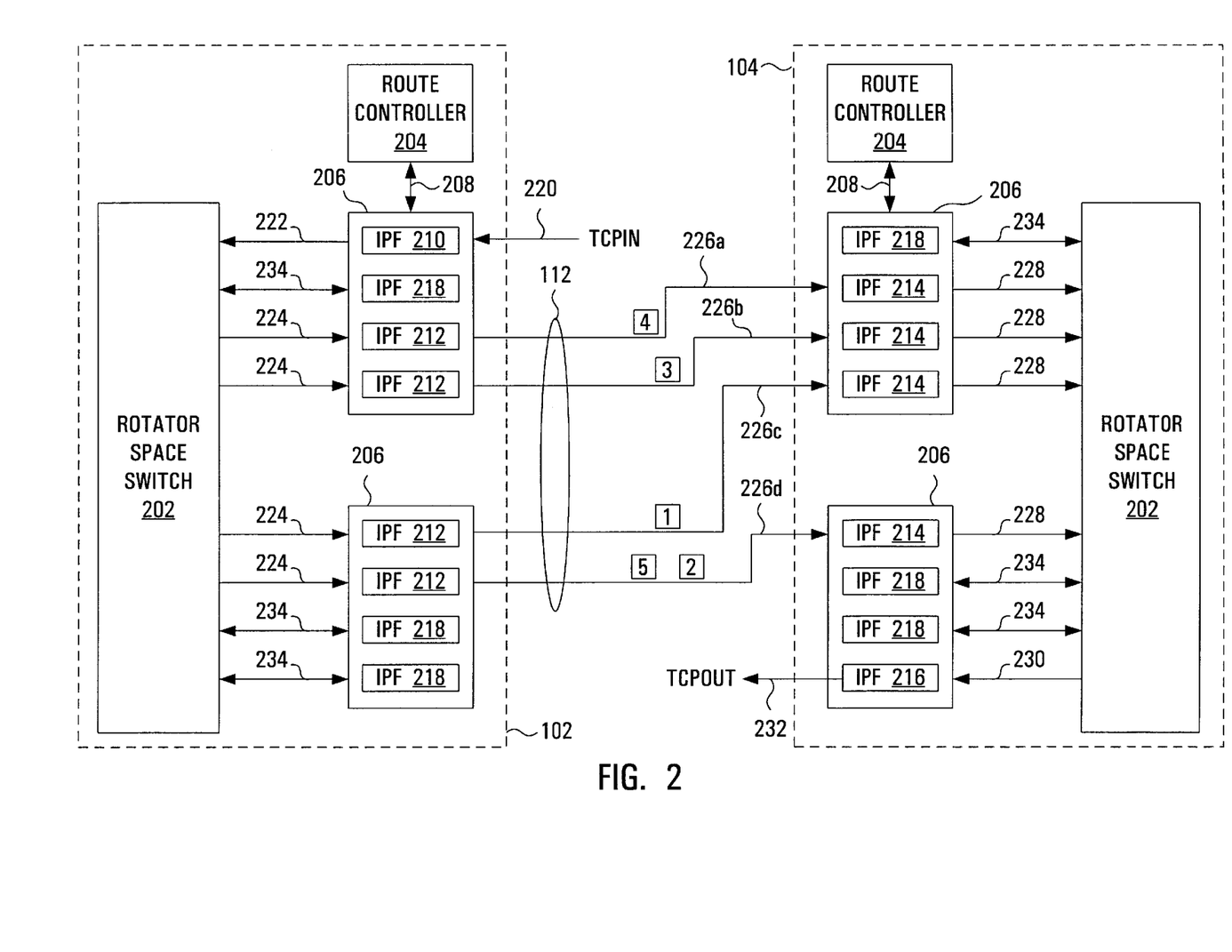
FIG. 2 is a block diagram of a routing system according to an example application of the preferred embodiment of the present invention.

FIG. 2 is a block diagram of a routing system between the first router 102 and the second router 104 illustrating an example application of the preferred embodiment of the present invention. Each router 102,104, according to the preferred embodiment, comprises a rotator space switch 202, a route controller 204, and a plurality of transport nodes 206. The routers 102,104 depicted in FIG. 2 each comprise two transport nodes, though this is not meant to limit the scope of the present invention. The rotator space switch 202 and the route controller 204 are independently coupled to each transport node 206, although, within FIG. 2, the route controller 204 is only shown to be coupled to one transport node 206 via signal bus 208.

A person skilled in the art would understand that the operation of the rotator space switch 202 and the route controller 204 would be specific to a particular company's implementation. For example, one such rotator space switch is disclosed in U.S. Pat. No. 5,745,486 entitled "High Capacity ATM Switch" by Beshai et al and assigned to the assignee of the present invention. No modifications are made in the route controller 204 and the rotator space switch 202 from prior art devices within the preferred embodiment of the present invention.

Each transport node 206 comprises a plurality of Internet Protocol Forwarding (IPF) nodes 210,212,214,216,218. In FIG. 2, each transport node 206 comprises four IPF nodes, though this is not meant to limit the scope of the present invention. In fact, the routers 102,104, in an alternative embodiment, do not comprise transport nodes, but instead have a plurality of IPF nodes, coupled independently to the route controller 204 and the rotator space switch 202, that are not within transport nodes.

The IPF nodes, within the system depicted in FIG. 2, include an input IPF node 210, a plurality of supertrunk output IPF nodes 212 representing a single logical output port, a plurality of supertrunk input IPF nodes 214 representing a single logical input port, an output IPF node 216, and a plurality of other IPF nodes 218 which are unrelated to the description herein below of an example application of the preferred embodiment of the present invention. Each IPF node, according to the preferred embodiment, is identical. Hence, any one of the IPF nodes may, in practice, be an input IPF node, a supertrunk output IPF node, a supertrunk input IPF node, or an output IPF node.

As depicted in FIG. 2, the input IPF node 210 is within a transport node of the first router 102 and is input with a TCP input signal (TCPIN) via line 220. The input IPF node 210 is coupled to the rotator space switch 202 of the first router 102 via line 222.

The plurality of supertrunk output IPF nodes 212 are spread across the transport nodes 206 of the first router 102. In this example, there are four supertrunk output IPF nodes 212 with two in each transport node 206 of the first router 102, though other configurations are possible. The supertrunk output IPF nodes 212 are each independently coupled to the rotator space switch 202 of the first router 102 via lines 224 and, via the supertrunk 112, to the second router 104. The supertrunk 112 comprises physical links 226a,226b, 226c,226d between the supertrunk output IPF nodes 212 (the physical output ports) within the first router 102 and the supertrunk input IPF nodes 214 (the physical input ports) within the second router 104.

The supertrunk input IPF nodes 214 are spread across the two transport nodes 206 of the second router 104. In this example, there are four supertrunk input IPF nodes 214, three in one transport node 206 and one in the other. This illustrated configuration is not meant to limit the scope of the present invention and it should be recognized that the number of supertrunk input IPF nodes 214 does not have to equal the number of supertrunk output IPF nodes 212. A single supertrunk output IPF node 212 could be coupled via a plurality of physical links to a plurality of supertrunk input IPF nodes 214 and a plurality of supertrunk output IPF nodes 212 could be coupled to the same supertrunk input IPF node 214. Each of the supertrunk input IPF nodes 214 are independently coupled to the rotator space switch 202 of the second router 104 via lines 228.

The output IPF node 216 is within the transport node 206 of the second router 104 that has only one supertrunk input IPF node 214, but it is recognized that the output IPF node 216 could be located in any transport node 206 of the second router 104. The output IPF node 216 is coupled to the rotator space switch 202 of the second router 104 via line 230 and outputs a TCP output signal (TCPOUT) via line 232.

The other IPF nodes 218 are simply shown within FIG. 2 to illustrate that other operations are being performed concurrently with the example application described herein below. Each of the other IPF nodes 218 is coupled to the rotator space switches 202 of the respective router 102,104 via lines 234.

The supertrunking operation of the routing system of FIG. 2, according to the preferred embodiment of the present invention, is now described by example. The TCPIN, which is an IP data stream in this case, is input to the input IPF node 210 packet by packet, each packet having an IP header attached to it. The input IPF node 210 attaches a Packet Forwarding Header (PFH), described in detail herein below, and a Rotator Information Unit (RIU) header to the particular packet. The PFH comprises an IP stream identifier that is a unique number generated for each IP stream that is input to the input IPF node 210 and a sequence number corresponding to the location of the packet relative to the other packets of the IP stream. The RIU header comprises a physical output port indicator that corresponds to a particular physical output port 212 determined for the particular IP packet within a load balancing function, also described in detail herein below.

These IP packets with their respective PFH and RIU header are then forwarded to their respective supertrunk output IPF nodes 212 via the line 222, the rotator space switch 202 of the first router 102, and the lines 224. The supertrunk output IPF nodes 212 then proceed, for each individual packet, to read the contents of the PFH, to remove the PFH and RIU header from the packet, and to encapsulate the packet, hereinafter referred to as an encapsulated packet, within a supertrunk header and an encapsulating IP header. The supertrunk header comprises the IP stream identifier and the sequence number while the encapsulating IP header comprises source and destination addresses that are copied from the source and destination addresses of the packet's original IP header. Hence, the destination address corresponds to the output IPF node 216 and the actual physical link 226 taken by the packet depends upon the network between the router 102 and the router 104. In this particular example, the encapsulated packets with sequence numbers 1, 2, 3, 4, and 5 have traversed physical links 226c, 226d, 226b, 226a, and 226d respectively. The criteria used within the load balancing function to distribute the encapsulated packets among the physical output ports 212 are described in detail later within this document.

The encapsulated packets are received at the supertrunk input IPF nodes 214. The supertrunk input IPF nodes 214, according to the preferred embodiment, read the destination address within the encapsulating IP header and subsequently forward the packets to the output IPF node 216 via the lines 228, the rotator space switch 202 of the second router 104, and the line 230. The output IPF node 216 re-orders the packets in the proper order with use of a sorting function, removes the encapsulating IP header and the supertrunk header from the packets, and outputs TCPOUT. TCPOUT, in this case, would be an IP stream consistent with the IP stream of TCPIN. The sorting function is described in detail later within this document.

Figure 3:
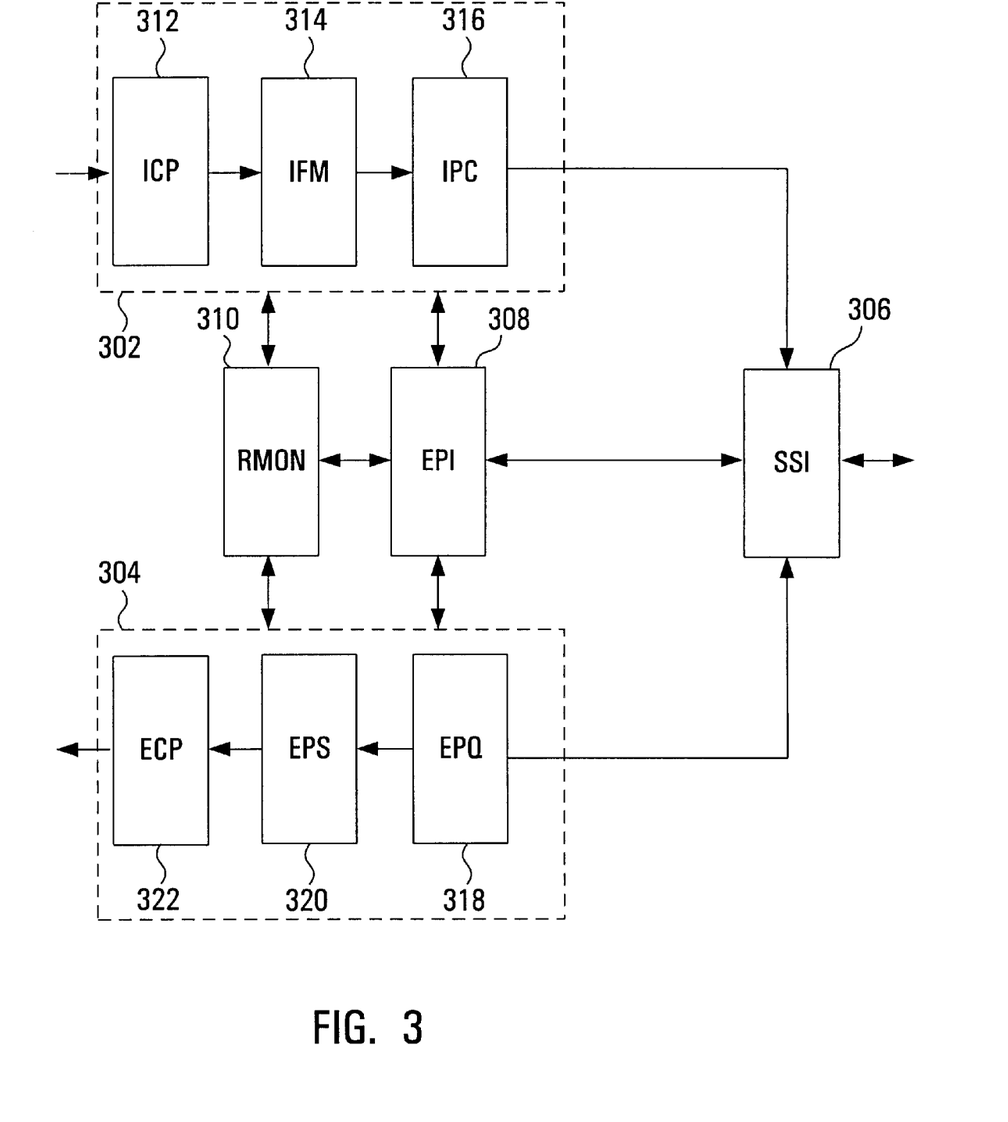
FIG. 3 is a block diagram of an Internet Protocol (IP) Forwarding (IPF) node used in FIG. 2.

The IPF nodes of FIG. 2 according to the preferred embodiment of the present invention are now described in detail with reference to FIG. 3. In this preferred embodiment, all of the IPF nodes are identical and therefore, all of the IPF nodes contain the load balancing function, the ability to encapsulate and de-encapsulate the packets, and the sorting function. As depicted in FIG. 3, each IPF node comprises an ingress block 302, an egress block 304, a Space Switch Interface (SSI) 306, an Embedded Processor Interface (EPI) 308, and a Router Monitor (RMON) 310. The ingress block 302 comprises an Ingress Convergence Processor (ICP) 312 coupled in series with an Ingress Filter and Mapper (IFM) 314, and an Ingress Port Controller (IPC) 316 further coupled to the SSI 306. The egress block 304 comprises an Egress Packet Queuer (EPQ) 318 coupled to the SSI 306 and further coupled in series with an Egress Packet Scheduler (EPS) 320, and an Egress Convergence Processor (ECP) 322. It is noted that according to the preferred embodiment, all of these components are discrete devices, though in alternative embodiments some or all of these components could be combined or implemented within software.

The EPI 308, in the preferred embodiment, is coupled to the components of both the ingress and egress blocks 302,304 along with the SSI 306 and the RMON 310. The RMON 310 is further coupled to at least one component in each of the ingress and egress blocks 302,304. In the preferred embodiment, the RMON 310 is coupled to the outputs of the IPC 316 and the EPS 320. The EPI 308 is the local processor for the IPF node that performs numerous processor related functions. The RMON 310, on the other hand, is utilized as a central point for all counters within the IPF node.

The following is a simplified description of the operation within the devices of the IPF node during ingress and egress functions according to the preferred embodiment of the present invention. It is noted that the devices of FIG. 3, with the exception of the IPC 316, the EPQ 318, and the ECP 322, are not modified in the preferred embodiment of the present invention and one skilled in the art would understand their operations.

Figure 4A:
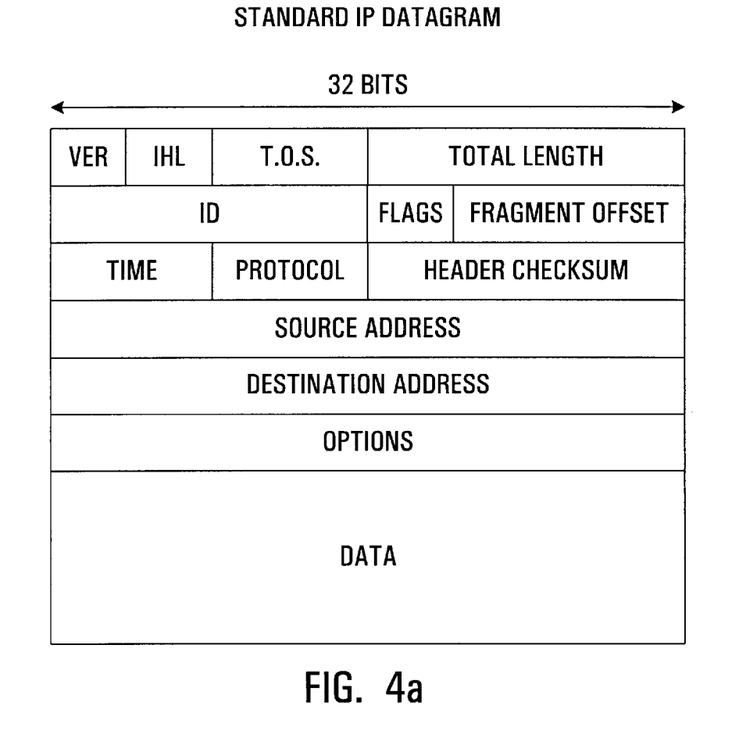
FIGS. 4a, 4b, and 4c illustrate a standard IP datagram, a Packet Forwarding Header (PFH) according to the preferred embodiment of the present invention, and an encapsulated IP packet according to the preferred embodiment of the present invention respectively.

In the preferred embodiment, IP datagrams, such as the standard one shown within FIG. 4a, are input to the input IPF node. During the receiving of an incoming IP data packet, the ICP 312 terminates the ingress physical and link layer interfaces, verifies the link layer, IP headers, and formatting, maps the incoming packet to a Receive Context Identifier (RCI) that is a generic tag to uniquely identify the logical interface that a packet arrived on, and encapsulates the packet with a PFH. As described herein below, not all the contents of the PFH are inserted by the ICP 312, but bytes are reserved for the entire PFH.

Figure 4B:
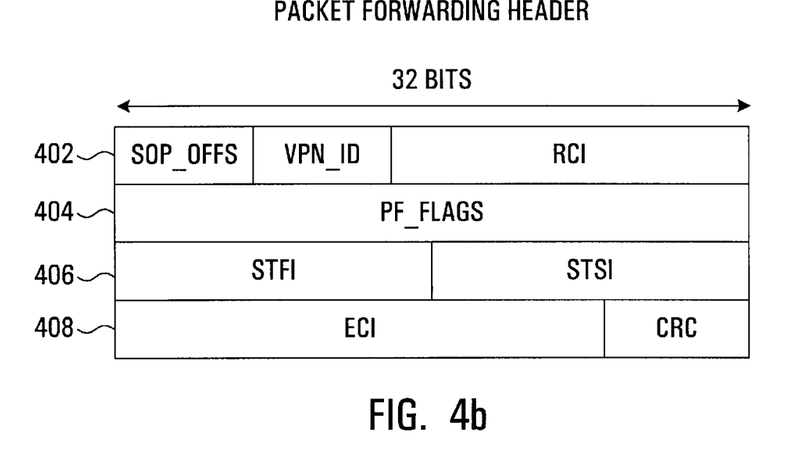

The PFH, with reference to FIG. 4b, comprises four 32 bit words. The first word 402 comprises a 4 bit Start Of Packet Offset (SOP_OFFS) signal that indicates the position of the first word of the packet to be sent to the link layer for segmentation, an 8 bit Virtual Private Network Identifier (VPN_ID) signal that identifies the virtual private network or virtual router interface that the packet arrived on, and the 20 bit RCI. The second word 404 comprises 32 bits of Packet Forwarding Flags (PF_FLAGS) that are a collection of generic status flags. The third word 406 comprises a 16 bit Supertrunk Flow Identifier (STFI) signal and a 16 bit Supertrunk Sequence Identifier (STSI) signal, both of which will be described in detail herein below. The fourth word 408 comprises a 24 bit Egress Context Identifier (ECI) that is the result of a forward look-up function which indicates the logical output port for the individual packet, and an 8 bit PFH Integrity Check (CRC). The contents of the first and second words 402,404 of the PFH are determined and inserted by the ICP 312. The third and fourth words 406,408 are reserved space by the ICP 312, but the contents of the third and fourth words 406,408 are determined and inserted by other devices as are described herein below.

The outputted packet from the ICP 312 is input to the IFM 314 which maps the incoming packet to the logical ECI, inserts the ECI into the PFH, and filters the packet based upon a configured policy. The IPC 316 then receives the packet and performs the load balancing function which, as will be described herein below, inserts the STFI and STSI signals into the PFH and encapsulates the packet in an RIU header which maps the packet to a physical port determined by the load balancing function.

Subsequently, the packet is input to the SSI 306 which is the interface between the rotator space switch 202 and the particular IPF node of FIG. 2. The SSI 306 then outputs the packet through the rotator space switch to the particular physical output port chosen by the load balancing function.

Figure 4C:
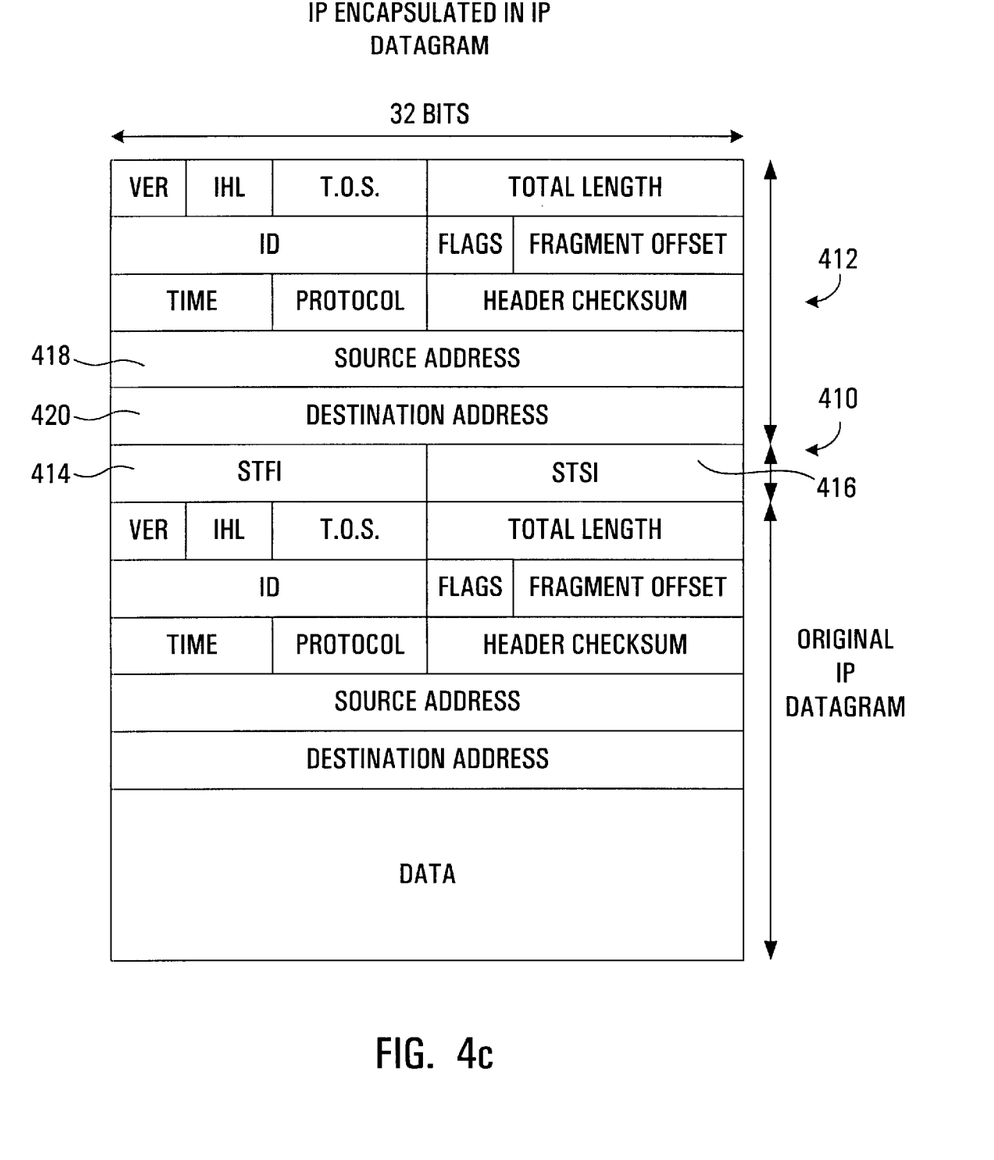

At the physical output port, the packet is input to the SSI 306 and forwarded, via the EPQ 318 and the EPS 320, to the ECP 322. The ECP 322 subsequently reads the STFI and STSI from the PFH, removes the PFH and the RIU header from the packet, and encapsulates, as depicted within FIG. 4c, the packet within a supertrunk header 410 and an encapsulating IP header 412. The supertrunk header 410 comprises the 16 bit STFI signal 414 and the 16 bit STSI signal 416, both of which are described in detail herein below, while the encapsulating IP header comprises a source address 418 and a destination address 420 that are copied from the IP header of the packet's original datagram. Hence the destination address within the encapsulating IP header corresponds to the output IPF node for the packet's IP stream.

The IP encapsulated packet is subsequently forwarded, via a physical link, to a physical input port; that being an IPF node within the router of the destination output IPF node. One key advantage of utilizing the IP encapsulating header is that the IP encapsulated packet is simply treated within any networks of the physical link as a standard IP datagram of FIG. 4a with the data portion of the datagram being the supertrunk header and the original IP datagram.

An alternative embodiment of the present invention does not have the packets encapsulated in an additional IP header. This embodiment has the disadvantage of requiring the physical link traversed by the packets to comprise strictly proprietary devices that can recognize the supertrunk header and can read the source and destination addresses of the original IP datagram.

Within the preferred embodiment of the present invention, the IP encapsulated packets are received at a physical input port and input to the corresponding ICP 312. The ICP 312 and the IFM 314 perform similar functions as described herein above, such as attaching a PFH to the IP encapsulated packet, and forwards the encapsulated packet to the IPC 316. The load balancing function within the IPC 316 is not performed on the encapsulated packet since the output IPF node for the packet is within the same router. The IPC 316 simply attaches an RIU header, which maps the packet to the output IPF node indicated by the destination address of the encapsulating IP header, to the already encapsulated packet and forwards it, via the SSI 306 and the rotator space switch, to the SSI 306 of the output IPF node.

The packet is forwarded by the SSI 306 of the output IPF node to the EPQ 318. The EPQ 318 reassembles packet segments, re-orders the encapsulated packets utilizing the sorting function, as is described in detail herein below, and notifies the EPS 320 of the availability of packets to be scheduled. Subsequently, the EPS 320 maps the packets to scheduling queues and outputs the encapsulated packets in the proper order to the ECP 322. The ECP 322 removes the PFH, RIU header, supertrunk header, and IP encapsulating header and performs L2 and PHY encapsulation functions as required.

Figure 5:
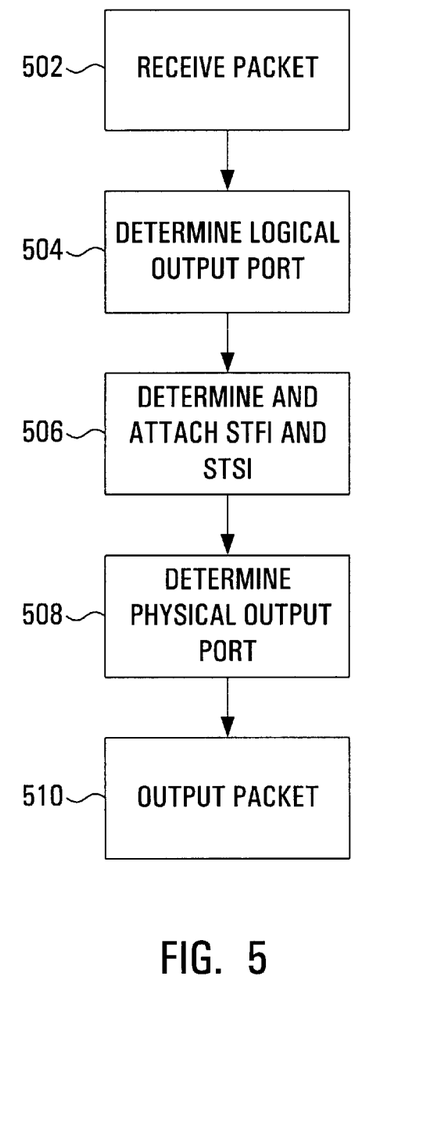
FIG. 5 is a flow chart illustrating steps performed by the Ingress Port Controller (IPC) according to the preferred embodiment of the present invention.

The detailed description of the load balancing function, according to the preferred embodiment of the present invention, performed within the IPC 316 is now described with reference to FIG. 5. Firstly, as depicted at step 502, the load balancing function receives the packet from the IFM 314. Next, the function determines, at step 504, the logical output port corresponding to the input packet. This is done in the preferred embodiment, by reading the ECI within the PFH that was inserted by the IFM 314 after a look-up function was completed.

Subsequently, as depicted at step 506, the STFI and STSI signals are determined for the packet and inserted into the corresponding PFH. The STFI is a unique identifier for the data stream, preferably an IP stream, in which the packet, preferably an IP packet, is part. A data stream is defined, in the preferred embodiment, by the ECI that the packet has been assigned, with each of the STFI signals being saved in a look-up table along with their corresponding ECIs. Hence, the first packet of a data stream will have an ECI not found in the look-up table and so will be assigned a new STFI signal. Subsequent packets of the same stream, with identical ECI, will be assigned the identical STFI signal. An ECI is removed from the look-up table after a predetermined refresh period has expired that indicates that no further packets of that particular data stream are still to arrive.

The STSI signal is a unique indicator given to each packet within a particular data stream that corresponds to the order in which the packet was input to the IPC 308. This STSI signal, within one embodiment, is simply a binary number that indicates the number packets of the data stream that have arrived since the first packet of the data stream was received. In another embodiment, the STSI signal is a time stamp given to the packet, the time stamp indicating the time of arrival of the packet and therefore the order.

The next step within the load balancing function, as depicted at step 508, is to determine the physical output port for the packet to traverse. This is the key to the effectiveness of the load balancing function and can be done in numerous different ways.

According to the preferred embodiment of the present invention, a Link Load Factor (LLF) is generated within the load balancing function for each of the available physical output ports. This is determined with use of the following formula:

$$LLF = (LSF) * (Qsize)$$

where, LSF is the Link Speed Factor and Qsize is the Queue Size. The LSF is calculated by statistical means and is individually determined for each available physical output port. The Qsize is a running total of the total bytes sent to the physical output port of which have not been sent to a physical link. In the preferred embodiment, this calculation of LLFs for each physical output port is done within each IPC 316, though in an alternative embodiment these calculations are done in a central location within the router such as the route controller, and the calculated LLFs are bused to the individual IPF nodes. In the preferred embodiment, the size of the LSF is inversely proportional to the speed of the physical output port. Therefore, to make load balancing optimal, the current packet is directed to the physical output port with the smallest LLF.

The packet is directed to a particular physical output port, according to the preferred embodiment, by the IPC 316 attaching an RIU header that indicates the physical output port to be utilized. Finally, at step 510, the packet is output from the load balancing function and subsequently routed, via the SSI 306 and the rotator space switch to the physical output port directed by the RIU header.

Alternative embodiments of the present invention may use different methods to determine the physical output port for a packet compared to that disclosed herein for the preferred embodiment. One such alternative technique is disclosed within the previously referenced U.S. patent application Ser. No. 09/215,376 entitled "Flow-Level Demultiplexing within Routers" filed on Dec. 18, 1998 by Almulhem et al, which details that the determination of the physical output ports is important for the effectiveness of the load balancing function and can be done in numerous different ways. According to Almulhem et al., a Link Available Bandwidth (LAB) in units of bytes/sec. The LAB is generated within the load balancing function for each of the available physical output ports. This is determined with use of the following formula:

$$LAB = (LBW) - (IR) * (APS)$$

where, LBW is the Link Bandwidth in units of bytes/sec, IR is the Input Rate in units of packets/sec, and APS is the Average Packet Size. The LBW is known for each available physical output port while the IR and the APS are generated by statistical means described herein below.

To calculate, the IR of a particular physical output port, an exponentially weighted moving average (EWMA) technique is used that generates a continuously adjusting long term average of the number of packets per second being routed through the particular physical output port. To calculate the APS for all the physical output ports, an EWMA technique is also used that generates a long-term average of the size of the packets being sent. Alternatively, the APS can be calculated once using a large amount of data and subsequently is constant. This method of determining physical output ports is specific to flow-level load balancing, but one skilled in the art would understand that it could be modified for packet-level load balancing as described herein.

Figure 7:
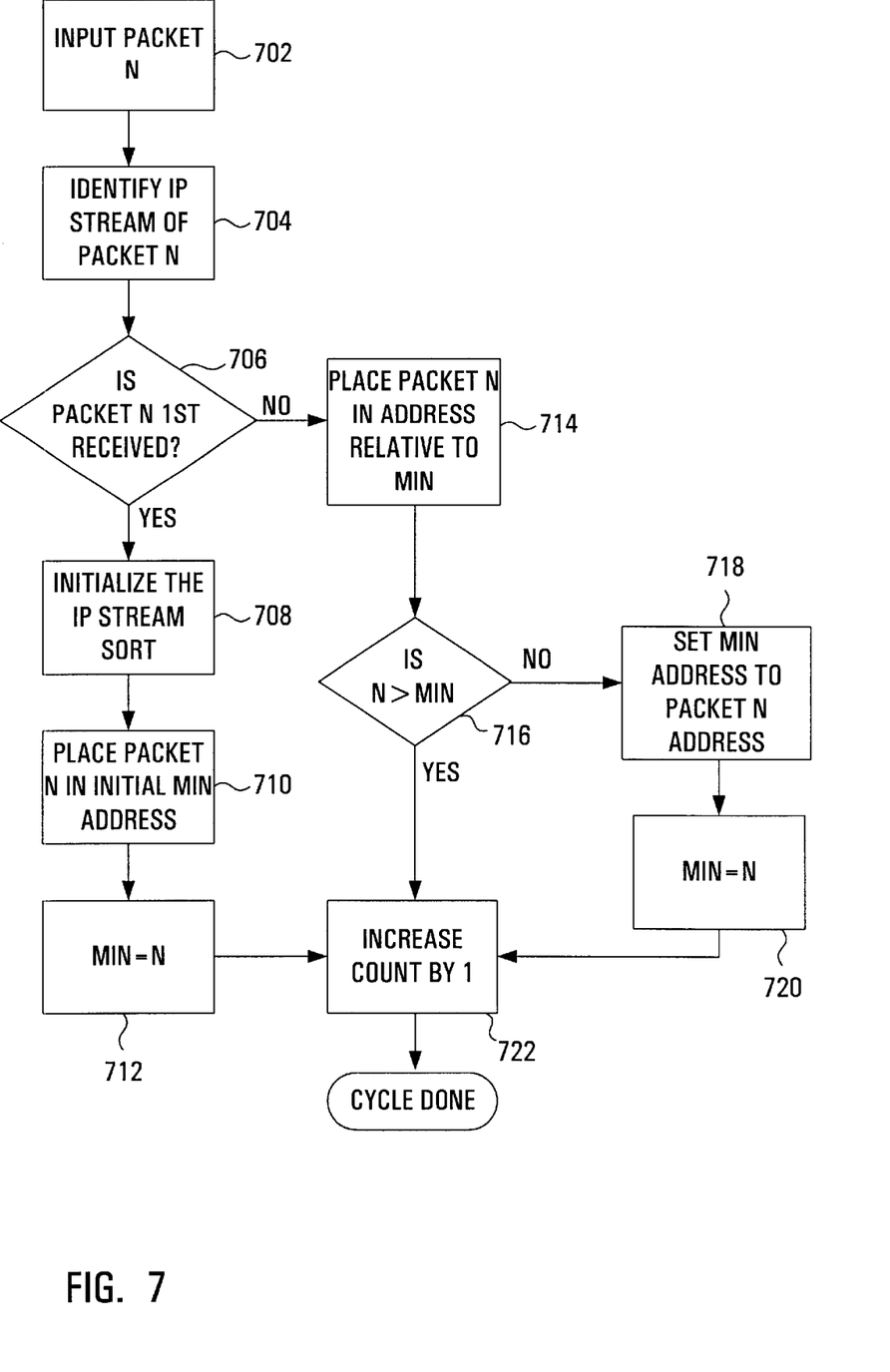
FIG. 7 is a flow chart illustrating the steps performed by the Sorting Function according to FIG. 6.

The sorting algorithm, according to the preferred embodiment, is now described with reference to FIG. 7 for a single operational cycle that could comprise one or more clock cycles. The individual packet with STSI signal N, hereinafter referred to as packet N, is input to the algorithm as depicted at step 702. Subsequently, the IP stream corresponding to the packet N is identified at step 704. This is done, in the preferred embodiment, with use of the STFI signal. The determination is then made, at step 706, whether the packet N is the first packet received from the particular IP stream.

If it is found at step 706 that the packet N is the first of its IP stream to be received, an initialization is performed at step 708 within the EPQ 318 for the particular IP stream. During this initialization, a first address is setup in a buffer memory within the EPQ 318 for the packet of the IP stream with the lowest STSI signal and a count signal for the IP stream is set to zero. After step 708, the packet N is placed, at step 710, within the first address and the STSI of the lowest packet, hereinafter referred to as the min, is defined to be N at step 712. The address of the min is hereinafter referred to as the min address, hence the initial min address is the first address.

If at step 706 the packet N is determined not to be the first packet of its IP stream, the packet N is placed at step 714 within the buffer memory at an address relative to the min address. This placement is determined with use of the following formula:

$$\text{address} = [N - \text{min}] + (\text{min address})$$

Following the placing of the packet N in the buffer memory at step 714, the algorithm determines if N is greater than min at step 716. If it is determined that N is not larger than min at step 716, the min address is set at step 718 to the address of the packet N and min is set equal to N as depicted at step 720.

At the completion of any one of steps 712, 716, or 720, the algorithm increases the count signal by one at step 722, completing the particular operational cycle. In fact, the count signal is incremented by one every operational cycle, whether a packet within the particular data stream is input or not.

Figure 6:
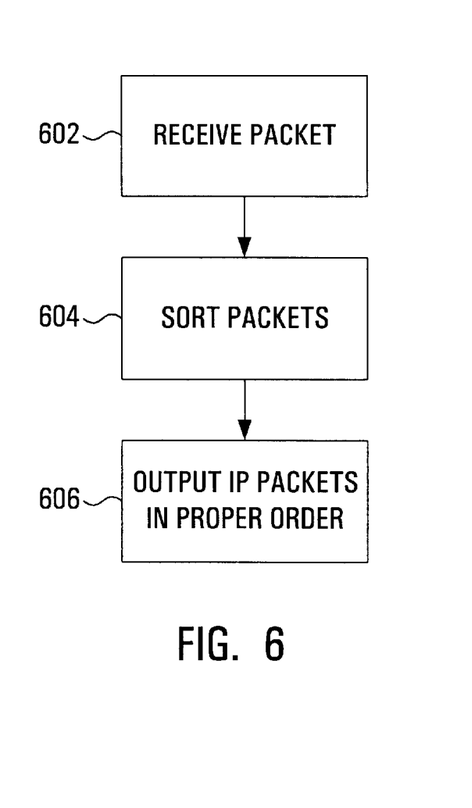
FIG. 6 is a flow chart illustrating steps performed by the Egress Packet Queuer (EPQ) according to the preferred embodiment of the present invention.

When the clock signal reaches a predetermined maximum, indicating that a window period has expired, the sorting function outputs the packet within the min address to the EPS 320, increments the min address by one, and resets the count signal to zero. The window period is the length of time that a packet in the min address must wait to ensure that no further packets lower in STSI are still to arrive at the EPQ 318. If there is no packet within the min address when the window period expires, which could occur if the min address was incremented to a location with no packet and the count signal subsequently reached the predetermined maximum, the sorting function, according to the preferred embodiment, simply resets the count signal to zero and continues to operate as normal. In an exemplary embodiment, the sorting function will only do this once, the next time having the min address increment by one as well as resetting the count signal, hence assuming that the packet is lost that should be found in the particular location. In the preferred embodiment, once the sorting function detects that the min address has been incremented three times with no packets being output, the sorting function declares the data stream complete, hence allowing the memory reserved for the particular data stream to be utilized for other operations. This completes the outputting from the sorting function, as depicted at step 606, of the individual packets in the proper order.

An alternative embodiment of the present invention uses a modified version of the sorting function that is consistent with that disclosed within U.S. Pat. No. 6,246,684 granted Jun. 12, 2001 entitled "Method and Apparatus for Re-ordering Data Packets in a Network Environment" by Chapman et al and assigned to the assigned of the present invention.

Another alternative embodiment of the present invention, changes the place in which the IP encapsulating header is removed. Rather being removed within the output IPF node 216, it is removed within the particular physical input port 214 in which the packet is received at. This removal of the IP encapsulating header, according to this embodiment, is done after reading the destination address and therefore having sufficient information for the RIU header to route the packet to the corresponding output IPF node.

Persons skilled in the art will appreciate that there are alternative implementations and modifications possible to use an apparatus similar to that described above to provide a routing system, over multiple physical links, and that the above implementation is only an illustration of this embodiment of the invention. The scope of the invention, therefore, is only to be limited by the claims appended hereto.

What is claimed is:

1. A forwarding node capable of operation within a router that transfers digital data with a plurality of other routers within a packet routing system, the forwarding node comprising:

a load balancing device that, when input with individual packets of a data stream, reads a logical output port corresponding to the data stream, assigns each of the individual packets of the data stream to a physical output port within the logical output port based upon physical link criteria, encapsulates the individual packets with a first routing header that comprises a data stream identifier, a packet sequence identifier, and a physical output port identifier, and outputs the packets to their assigned physical output ports; and a packet sorting device that, when input with encapsulated packets, re-orders the packets into the proper order with use of a sorting algorithm utilizing the packet sequence identifiers and outputs a data stream corresponding to the re-ordered packets.

2. A forwarding node according to claim 1, wherein the first routing header is a packet forwarding header combined with a rotator information unit header; and wherein the packet forwarding header comprises the data stream identifier and the packet sequence identifier, and the rotator information unit header comprises the physical output port identifier.

3. A forwarding node according to claim 1 further comprising a de-encapsulation device that, when input with the data stream corresponding to the re-ordered packets, removes the first routing header from each of the encapsulated packets.

4. A forwarding node according to claim 1 further comprising an encapsulation device that, when input with packets from the load balancing device, removes the first routing header from each of the packets, encapsulates each of the individual packets with a second routing header that comprises a data stream identifier and a packet sequence identifier and outputs the encapsulated packets to transmission apparatuses.

5. A forwarding node according to claim 4, wherein the second routing header is a supertrunk header combined with an Internet Protocol (IP) header;

wherein the supertrunk header comprises the data stream identifier and the packet sequence identifier; and wherein each of the encapsulated packets is an IP datagram with the supertrunk header and the original packet corresponding to a data section within the IP datagram.

6. A forwarding node according to claim 5, wherein the data streams are Internet Protocol (IP) streams and the individual packets of the data streams are IP packets; and wherein the IP header of the second routing header comprises source and destination addresses that are identical to source and destination addresses within an IP header of the particular IP packet.

7. A forwarding node according to claim 4 further comprising a de-encapsulation device that, when input with the data stream corresponding to the re-ordered packets, removes the second routing header from each of the encapsulated packets.

8. A forwarding node according to claim 1, wherein the data streams are Internet Protocol (IP) streams and the individual packets of the data streams are IP packets.

9. A forwarding node according to claim 8, wherein the load balancing device reads the logical output port corresponding to the data streams with use of IP headers attached to the individual IP packets.

10. A forwarding node according to claim 1, wherein the physical link criteria are load link factors calculated for each of the available physical output ports, the load link factors equalling a link speed factor representative of the speed of the particular physical output port multiplied by a queue size representative of the packets already queued within the particular physical output port.

11. A forwarding node according to claim 10, wherein the load balancing device assigns each of the individual packets of the data stream to the physical output port that at the particular time has the lowest load link factor.

12. A forwarding node according to claim 1, wherein the packet sequence identifier is a binary number corresponding to the relative position within the data stream of the particular packet.

13. A forwarding node according to claim 1, wherein the packet sequence identifier is a time stamp corresponding to the relative time that the particular packet was input to the load balancing device.

14. A forwarding node according to claim 1, wherein the data stream identifier is generated by the load balancing device when a packet of a new data stream is detected; and wherein all the packets of the data stream are assigned the same data stream identifier with use of a look-up table.

15. A forwarding node according to claim 14, wherein a new data stream is detected with use of an egress context identifier determined with a look-up table.

16. A forwarding node according to claim 1, wherein the sorting algorithm, input with an individual packet of a particular data stream, comprises the steps of:

identifying the particular data stream of the inputted packet with use of the data stream identifier;

determining if the packet is the first packet of the particular data stream to be input to the sorting algorithm;

initializing a buffer memory for the particular data stream, if the packet is the first packet, by placing the packet within a minimum address and setting a minimum variable to the packet sequence identifier of the packet; and updating the memory buffer for the particular data stream, if the packet is not the first packet, by placing the packet in an address relative to the minimum address based upon the difference between the packet sequence identifier of the packet and the minimum variable, and if the packet sequence identifier of the packet is less than the minimum variable, setting the minimum address to the address of the packet and setting the minimum variable to the packet sequence identifier of the packet.

17. A forwarding node according to claim 16, wherein, if a packet is at the minimum address and a predetermined hold time expires, the packet at the minimum address is output from the packet sorting device, the minimum address is incremented by one, and the predetermined hold time is reset.

18. A forwarding node according to claim 17, wherein, if no packet is at the minimum address and the predetermined hold time expires, the predetermined hold time is reset.

19. A forwarding node according to claim 1 comprising an ingress block that is arranged to input packets from a transmission device and comprises the load balancing device, an egress block that is arranged to output packets to the transmission device and comprises the packet sorting apparatus, and a switch interface, coupled to both the ingress and egress blocks, that is arranged to be coupled to a switch apparatus.

20. A forwarding node according to claim 19, wherein the ingress block comprises an ingress processor coupled in series with an ingress filter and mapper and an ingress port controller that is further coupled to the switch interface, and the egress block comprises an egress queuer coupled to the switch interface and further coupled in series with an egress scheduler and an egress processor;

wherein the ingress port controller comprises the load balancing device and the egress queuer comprises the packet sorting device.

21. A forwarding node according to claim 20, wherein the egress processor comprises an encapsulation device that, when input with packets from the load balancing device, removes the first routing header from each of the packets, encapsulates each of the individual packets with a second routing header that comprises a data stream identifier and a packet sequence identifier and outputs the encapsulated packets to transmission apparatuses.

22. A forwarding node according to claim 21, wherein the egress processor further comprises a de-encapsulation device that, when input with the data stream corresponding to the re-ordered packets, removes the second routing header from each of the encapsulated packets.

23. A router capable of operation within a packet routing system that transfers digital data between a plurality of the routers, the router comprising:

a route controller;

a rotator space switch;

at least one first forwarding node, coupled to both the route controller and the rotator space switch, comprising a load balancing device that, when input with individual packets of a data stream, reads a logical output port corresponding to the data stream, assigns each of the individual packets of the data stream to a physical output port within the logical output port based upon physical link criteria, encapsulates the individual packets with a first routing header that comprises a data stream identifier, a packet sequence identifier, and a physical output port identifier, and outputs the packets to their assigned physical output ports;

at least one second forwarding node, coupled to both the route controller and the rotator space switch, that is arranged to operate as a physical output port for outputting encapsulated packets to at least one transmission apparatus;

at least one third forwarding node, coupled to both the route controller and the rotator space switch, that is arranged to operate as a physical input port for receiving encapsulated packets from at least one transmission apparatus; and at least one fourth forwarding node, coupled to both the route controller and the rotator space switch, comprising a packet sorting device that, when input with encapsulated packets, re-orders the packets into the proper order with use of a sorting algorithm utilizing the packet sequence identifiers and outputs a data stream corresponding to the re-ordered packets.

24. A router according to claim 23, wherein at least two of the first, second, third, and fourth forwarding nodes are the same forwarding node.

25. A router according to claim 23, wherein the first routing header is a packet forwarding header combined with a rotator information unit header; and wherein the packet forwarding header comprises the data stream identifier and the packet sequence identifier, and the rotator information unit header comprises the physical output port identifier.

26. A router according to claim 23, wherein the fourth forwarding node further comprises a de-encapsulation device that, when input with the data stream corresponding to the re-ordered packets, removes the first routing header from each of the encapsulated packets.

27. A router according to claim 23, wherein the second forwarding node comprises an encapsulation device that, when input with packets from the load balancing device, removes the first routing header from each of the packets, encapsulates each of the individual packets with a second routing header that comprises a data stream identifier and a packet sequence identifier and outputs the encapsulated packets to transmission apparatuses.

28. A router according to claim 27, wherein the fourth forwarding node further comprises a de-encapsulation device that, when input with the data stream corresponding to the re-ordered packets, removes the second routing header from each of the encapsulated packets.

29. A router according to claim 27, wherein the third forwarding node comprises a de-encapsulation device that removes the second routing header from each of the encapsulated packets and attaches a third routing header that comprises a data stream identifier, a packet sequence identifier, and a fourth forwarding node identifier.

30. A router according to claim 29, wherein the third routing header is a packet forwarding header combined with a rotator information unit header; and wherein the packet forwarding header comprises the data stream identifier and the packet sequence identifier, and the rotator information unit header comprises the fourth forwarding node identifier.

31. A router according to claim 27, wherein the second routing header is a supertrunk header combined with an Internet Protocol (IP) header;

wherein the supertrunk header comprises the data stream identifier and the packet sequence identifier; and wherein each of the encapsulated packets is an IP datagram with the supertrunk header and the original packet corresponding to a data section within the IP datagram.

32. A packet routing system that transfers digital data between at least one first router and at least one second router, the packet routing system comprising:

the first router comprising: a first route controller; a first rotator space switch; at least one first forwarding node, coupled to both the first route controller and the first rotator space switch, comprising a load balancing device that, when input with individual packets of a data stream, reads a logical output port corresponding to the data stream, assigns each of the individual packets of the data stream to a physical output port within the logical output port based upon physical link criteria, encapsulates the individual packets with a first routing header that comprises a data stream identifier, a packet sequence identifier, and a physical output port identifier, and outputs the packets to their assigned physical output ports; at least one second forwarding node, coupled to both the first route controller and the first rotator space switch, that is arranged to operate as a physical output port for outputting encapsulated packets to at least one transmission apparatus;

a plurality of transmission apparatuses coupled between the first and second routers; and the second router comprising: a second route controller; a second rotator space switch; at least one third forwarding node, coupled to both the second route controller and the second rotator space switch, that is arranged to operate as a physical input port for receiving encapsulated packets from at least one transmission apparatus; and at least one fourth forwarding node, coupled to both the second route controller and the second rotator space switch, comprising a packet sorting device that, when input with encapsulated packets, re-orders the packets into the proper order with use of a sorting algorithm utilizing the packet sequence identifiers and outputs a data stream corresponding to the re-ordered packets.

33. In a packet routing system comprising a plurality of routers, a method of transferring digital data between the routers comprising the steps of:

inputting individual packets of a data stream into a first router;

reading a logical output port corresponding to the data stream of the individual packets;

assigning each of the individual packets of the data stream to a physical output port within the logical output port based upon physical link criteria;

encapsulating each of the individual packets with a first routing header that comprises a data stream identifier, a packet sequence identifier, and a physical output port identifier corresponding to the assigned physical output port;

transmitting each of the encapsulated packets, via their assigned physical output port, to a second router;

re-ordering the resulting packets into the proper order with use of a sorting algorithm utilizing the packet sequence identifiers; and outputting a data stream corresponding to the re-ordered packets.

* * * * *